US007814290B1

(12) United States Patent
Pliss et al.

(10) Patent No.: US 7,814,290 B1
(45) Date of Patent: Oct. 12, 2010

(54) SYNCHRONOUS DETECTION AND SIGNALING OF MEMORY QUOTA VIOLATIONS FOR SEQUENTIAL MEMORY ALLOCATION IN A SHARED HEAP

(75) Inventors: Oleg A. Pliss, Santa Clara, CA (US);
Bernd J. W. Mathiske, Cupertino, CA (US)

(73) Assignee: Oracle America, Inc., Redwood Shores, CA (US)

( * ) Notice: Subject to any disclaimer, the term of this patent is extended or adjusted under 35 U.S.C. 154(b) by 1013 days.

(21) Appl. No.: 11/266,846

(22) Filed: Nov. 3, 2005

(51) Int. Cl.
*G06F 12/00* (2006.01)
*G06F 13/00* (2006.01)
*G06F 13/28* (2006.01)

(52) U.S. Cl. ...................................... 711/171
(58) Field of Classification Search .................. None
See application file for complete search history.

(56) References Cited

U.S. PATENT DOCUMENTS 7,028,298 B1 * 4/2006 Foote ........................ 718/104
7,206,890 B2 * 4/2007 Mathiske ...................... 711/6
7,424,589 B1 * 9/2008 Pliss et al. ................. 711/170

* cited by examiner

*Primary Examiner*—Kevin L Ellis
*Assistant Examiner*—Gary W Cygiel
(74) *Attorney, Agent, or Firm*—Park, Vaughan & Fleming, LLP; Mark Spiller

(57) ABSTRACT

One embodiment of the present invention provides a method and a system for synchronous detection and signaling of memory quota violations for sequential memory allocation in a shared heap. The system detects a potential quota violation if a check of approximate memory usage indicates that an attempt to allocate memory may violate a task's memory quota. Upon detecting such a potential quota violation, the system proceeds to reconcile the task's exact memory usage. If the task's exact memory usage violates the task's memory quota, the system signals a synchronous quota violation at the time of the violation. Synchronously signaling quota violations in this manner provides accurate quota violation detection and signaling without reducing the performance of sequential memory allocation. The method also improves the accuracy of approximate per-task memory usage tracking by reconciling exact memory usage when an estimate of the task's memory usage exceeds the task's memory quota.

17 Claims, 3 Drawing Sheets

SYNCHRONOUS DETECTION AND SIGNALING OF MEMORY QUOTA VIOLATIONS FOR SEQUENTIAL MEMORY ALLOCATION IN A SHARED HEAP

BACKGROUND

1. Field of the Invention

The present invention relates to virtual machines within computer systems. More specifically, the present invention relates to a method and an apparatus for synchronous detection and signaling of memory quota violations for sequential memory allocation in a shared heap.

2. Related Art

The Java 2 Platform, Micro Edition (J2ME™), has become a very popular software platform for memory-constrained devices such as wireless devices. Motorola, Nokia, NTT DoCoMo, RIM, Siemens, and many other key players in the wireless device industry have shipped a large number of J2ME-enabled devices. In fact, based on some estimates, over 200 million J2ME-enabled mobile phones were shipped in 2003 alone.

A number of techniques to conserve memory have been developed to effectively run applications on such memory-constrained computing devices. One promising technique uses a shared heap to store objects from different tasks (or threads). This technique makes better use of memory space than the conventional technique, which uses a separate heap for each task. However, using a shared heap complicates both garbage-collection and memory-accounting operations.

In computing systems that do not have such memory constraints, data structures such as lookup tables can be used to keep track of per-task memory allocation. However, in memory-constrained computing devices, the high overhead required by such techniques can consume space and introduce time delays. Since modern programming languages (e.g. JAVA™) intensively allocate memory in heap, the speed of memory allocation is essential for program performance. One of the simplest and fastest memory-allocation techniques is sequential (or "pointer-bumping") allocation. Such fast memory allocation techniques can be combined with approximate-memory-usage tracking to achieve performance goals. However, the techniques used to track approximate memory usage frequently only detect memory quota violations asynchronously to the time of the violation, which can lead to deviations in expected program behavior.

Hence, what is needed is a method and an apparatus for synchronously detecting and signaling memory quota violations for sequential memory allocation in a shared heap without the above-described problems.

SUMMARY

One embodiment of the present invention provides a method and a system for synchronous detection and signaling of memory quota violations for sequential memory allocation in a shared heap. The system detects a potential quota violation if a check of approximate memory usage indicates that an attempt to allocate memory may violate a task's memory quota. Upon detecting such a potential quota violation, the system proceeds to reconcile the task's exact memory usage. If the task's exact memory usage violates the task's memory quota, the system signals a synchronous quota violation at the time of the violation. Synchronously signaling quota violations in this manner provides accurate quota violation detection and signaling without reducing the performance of the critical path of sequential memory allocation. The method also improves the accuracy of approximate per-task memory usage tracking by reconciling exact memory usage when an estimate of the task's memory usage exceeds the task's memory quota.

In a variation on this embodiment, approximate memory usage is detected using an 'allocation end' variable that contains a value corresponding to the end of available memory in the shared heap. Normally, the memory allocation function ensures that the attempt to allocate memory will not result in exceeding the value in the 'allocation end' variable. The system dynamically computes in a memory usage tracker a conservative estimate of the amount of memory available for the task, and replaces the value in the 'allocation end' variable with this conservative estimate. As a result, the attempt to allocate memory will initially fail if the task attempts to allocate beyond the conservative estimate of the task's memory quota.

In a further variation, reconciling the exact memory usage of the task involves triggering a remedial action if the attempt to allocate memory fails initially. This remedial action can include a generational and/or full garbage-collection operation.

In a variation on this embodiment, the system tracks approximate per-task memory usage asynchronously, but detects and signals memory quota violations synchronously.

In a further variation, the system can dynamically update a task's memory quota at the time the task switches and/or during a system function call.

In a variation on this embodiment, the shared heap is located within a memory-constrained computing device.

In a variation on this embodiment, the shared heap is located within a platform-independent virtual machine.

In a further variation, the platform-independent virtual machine is a JAVA™ Virtual Machine.

In a further variation, the system signals a violation at the time of the quota violation by throwing a JAVA™ out-of-memory exception.

Table 1 illustrates a memory allocation function that prevents memory quota violations by checking the quota during every memory allocation in accordance with an embodiment of the present invention.

Table 2 illustrates pseudo-code for typical inline and slow memory allocation functions in accordance with an embodiment of the present invention.

Table 3 illustrates code that updates the allocation end in accordance with an embodiment of the present invention.

Table 4 illustrates an updated memory allocation function that enables synchronous detection and overhead of memory quota violations without adding overhead to common memory allocation operations in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs).

Memory-Constrained Computing Device with a Shared Heap

Figure 1:
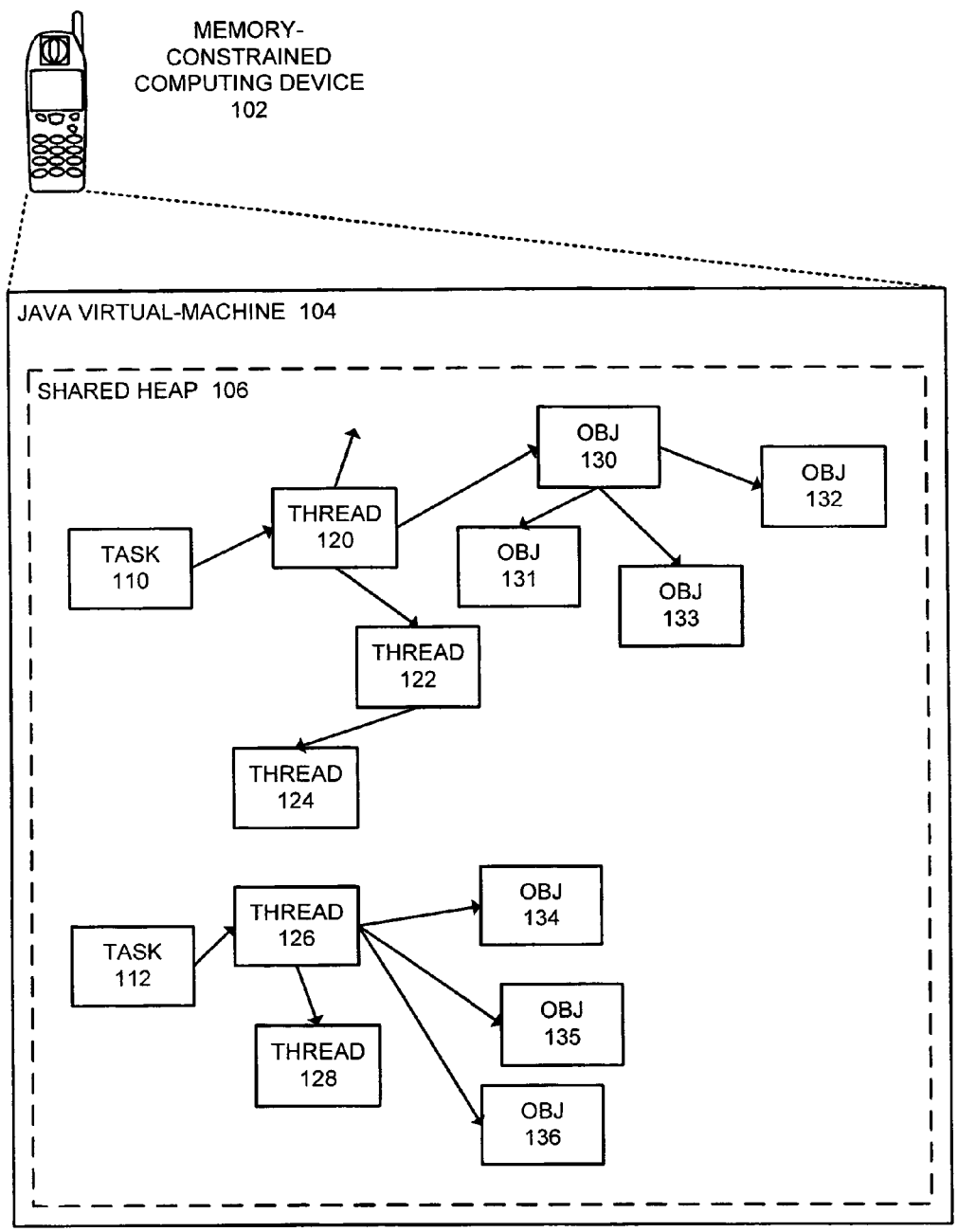
FIG. 1 illustrates a memory-constrained computing device with a shared heap in accordance with an embodiment of the present invention.

FIG. 1 illustrates a memory-constrained computing device 102 with a shared heap in accordance with an embodiment of the present invention. Memory-constrained computing device 102 can include any type of computing device, including, but not limited to, a cell phone, a computer system based on a microprocessor, a digital signal processor, a portable computing device, a personal organizer, a device controller, and a computational engine within an appliance. Memory-constrained computing device 102 contains Java Virtual Machine (JVM) 104, which in turn contains shared heap 106. (The terms JAVA, JVM, and JAVA VIRTUAL MACHINE are trademarks of SUN Microsystems, Inc. of Santa Clara, Calif.) Note that JVM 104 could be any type of platform-independent virtual machine, and is not meant to be limited to a Java Virtual Machine.

Shared heap 106 includes data structures associated with all of the tasks running on JVM 104, as well as the associated threads and objects. For example, in the illustrated embodiment, shared heap 106 includes task 110, and associated threads 120-124. Likewise, shared heap 106 also includes task 112, and associated threads 126-128. In addition, shared heap 106 includes objects 130-136 that are associated with the various threads.

Resource Usage Accounting

In one embodiment of the present invention, the memory quota management system includes four primary features:

1. A memory policy: The system assigns quotas to tasks depending on various task parameters to ensure fair resource usage. These quotas may change dynamically. The present invention assumes that there is a reasonable policy implemented, and that the system has a mechanism with which it can request and receive the specified quota for a task (e.g. a function called get_mem_quota (task)).
2. A memory-usage tracker: A memory quota system includes a mechanism for tracking approximate memory usage. No particular precision is required by this mechanism, and a number of previous inventions can be used, but the tracker should be able to, upon request, perform two functions for conservative estimation of per-task usage and for reconciliation:
   1. On request (e.g. in response to a call to a get_mem_usage (task) function), the tracker should return a conservative estimate of the memory used by a given task. A memory usage estimate is called conservative if it can never be less than actual memory usage. This estimation operation must be fast enough to not significantly affect program performance.
   2. On request, the tracker should reconcile the exact memory usage of a task. This function (e.g reconcile (task)) can be slow.

Higher precision of approximate per-task memory usage tracking lowers the overhead of the system described by the present invention.
3. A method for detecting memory quota violations: The system includes a mechanism to compare the task memory usage with the task memory quota. Such a mechanism should not impose a significant overhead on memory allocation, since sequential memory allocation is usually implemented in a very small and fast inline function.
4. A method for signaling memory quota violations: The system includes a method for signaling detected violations to the application.

The present invention provides methods for detecting and signaling memory quota violations.

In a single-tasking environment, the memory quota is effectively the hard limit imposed by the end of system memory. The system typically detects an attempt to allocate beyond this limit and handles the resulting fault. The implementation of memory quotas in a multi-tasking system that can run both single- and multi-tasking applications without application changes is more complex. Memory quota violations should still be detected and signaled, but the convenient hard limit no longer applies, since a task may violate its quota while free memory (from other tasks' quotas) is still available.

Since programming languages (e.g. JAVA™) usually do not provide a special signal for quota violation, an existing signal, such as an out-of-memory exception, has to be used to signal a quota violation. However, the semantics of out-of-memory exceptions are defined by the language standard, and signaling of quota violations should strictly follow the standard.

One option for detecting memory quota violations in a multi-tasking system involves high-precision tracking of memory usage. For instance, during every memory allocation a system can update the memory usage, compare it with the current task memory quota, and, if necessary, reconcile and signal a quota violation. However, such a technique adds high overhead and delay to every memory allocation, and can significantly affect performance. As a result, approximate memory-tracking techniques are used.

While approximate memory usage estimates result in lower overhead, they can lead to asynchronous detection and signaling of quota violations. For instance, if estimated memory usage is computed, and a quota violation is detected and signaled at the end of the time slice or during garbage collection, an out-of-memory exception may be thrown much later than the violating memory allocation. Such asynchronous detection and signaling is undesirable, since it can lead to deviations of expected program behavior. For instance, the well-known practice of reserving some space when beginning program execution for handling out-of-memory conditions may fail. Furthermore, synchronous signaling is also difficult to implement and unreliable. Not all program execution states are appropriate for out-of-memory exceptions. In fact, the program may have to wait an indefinite time interval to throw an asynchronous exception, for instance if the program is waiting for an event. If an exception cannot be thrown synchronously at the time of violation, and instead is thrown asynchronously at the time of detection, there may be no such handler defined to handle it. Two options in such a situation would be to throw the exception anyway, or to wait until the next valid moment, which may never come; both options violate conventional programming practices and may conflict with language specifications (e.g. the JAVA™ language specification).

In general, it is very difficult to achieve natural programming semantics with asynchronous detection and signaling of memory quota violations.

Synchronously Detecting and Signaling Memory Quota Violations

Ideally, the system should detect and signal quota violations synchronously, i.e. at the moment when a task allocates memory over its quota. One embodiment of the present invention provides a method that detects and signals memory quota violations synchronously in a system that uses asynchronous memory quota tracking.

As mentioned previously, if the memory-allocation operation is not time-critical, checks can be added to the allocation function (as shown in pseudo-code in Table 1) to prevent violations. However, such checks are slow, and thereby undesirable. A better solution is to only slow down the allocation function when a task is approaching its memory quota.

TABLE 1

```
allocate (task, size) {
    int usage = get_memory_usage(task);
    if (usage > get_memory_quota(task)) {
        reconcile ( );
    }
    if (usage > get_memory_quota(task)) {
        out_of_memory( );
    }
}
```

Figure 2A:
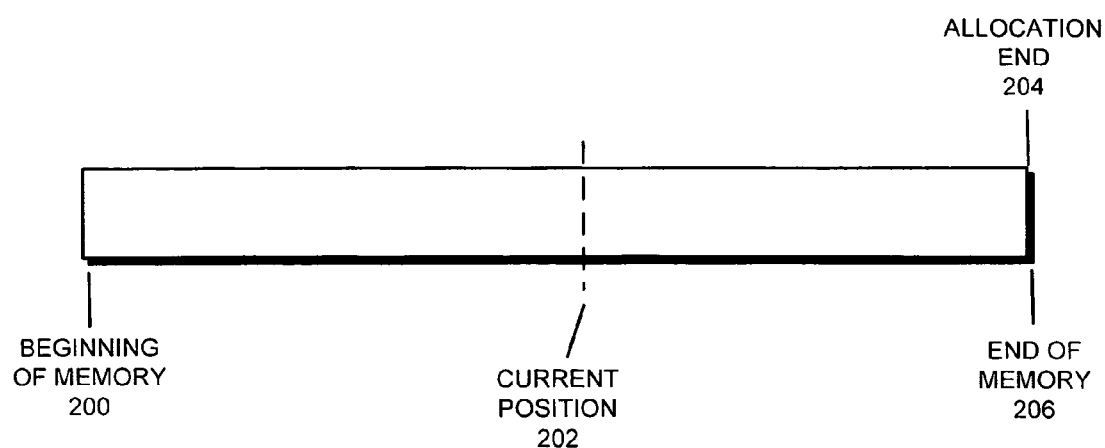
FIG. 2A illustrates a memory region with sequential allocation during task execution in accordance with an embodiment of the present invention.

FIG. 2A illustrates a memory region with sequential allocation during task execution. A typical sequential memory allocation function (shown in pseudo-code in Table 2) maintains two pointers to a memory region, specifically 'current position' 202 and 'allocation end' 204. The current position 202 indicates the beginning of the memory segment available for allocation, while the end pointer indicates the end of memory 206. On a memory allocation request, the current position is advanced by the given allocation size. The allocate function compares the advanced position with the allocation end pointer. If the allocation end 204 is exceeded, a garbage collector is called to resolve the conflict. Otherwise, the function returns the former value of current position as a result. Thus, the function checks that the desired allocation does not exceed the bounds of memory. The slow_allocate function calls garbage collection to ensure that enough free memory will be left, and throws an out-of-memory exception otherwise. The separation of fast and slow allocation is important, since fast allocation (the allocate function) is implemented as an inline function, and slow allocation is only rarely called.

Note that there are two variants of sequential allocation; one in the positive direction of memory addresses, and one in the negative direction. The present invention works equally well with both variants. Sequential memory allocation in the positive direction is shown for illustrative purposes only.

TABLE 2

```
inline byte* allocate ( size ) {
    byte* pos = current_position;
```

TABLE 2-continued

```
    if( pos + size > memory_end {
        pos = slow_allocate( size );
    }
    current_position = pos + size;
    return pos;
}
byte* slow_allocate( size ) {
    garbage_collect( size );
    byte* p = current_position;
    if( p + size > memory_end ) {
        throw( out_of_memory_exception );
    }
    return p;
}
```

Figure 2B:
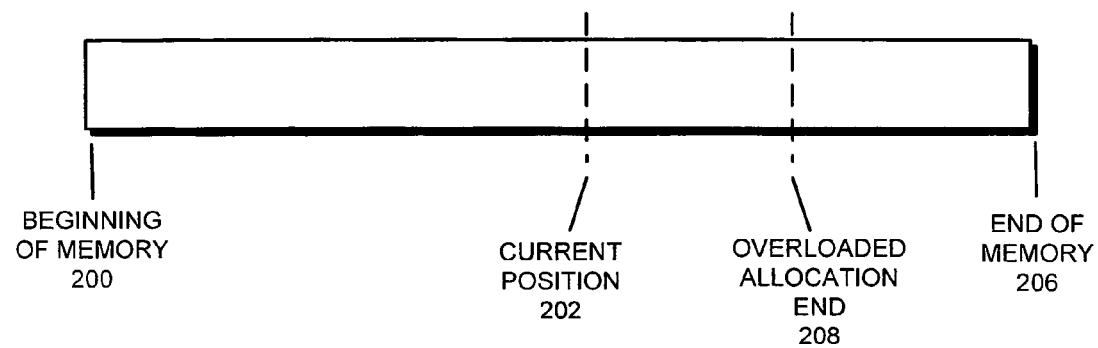
FIG. 2B illustrates a memory region with sequential allocation and modified pointers during task execution in accordance with an embodiment of the present invention.
Figure 3:
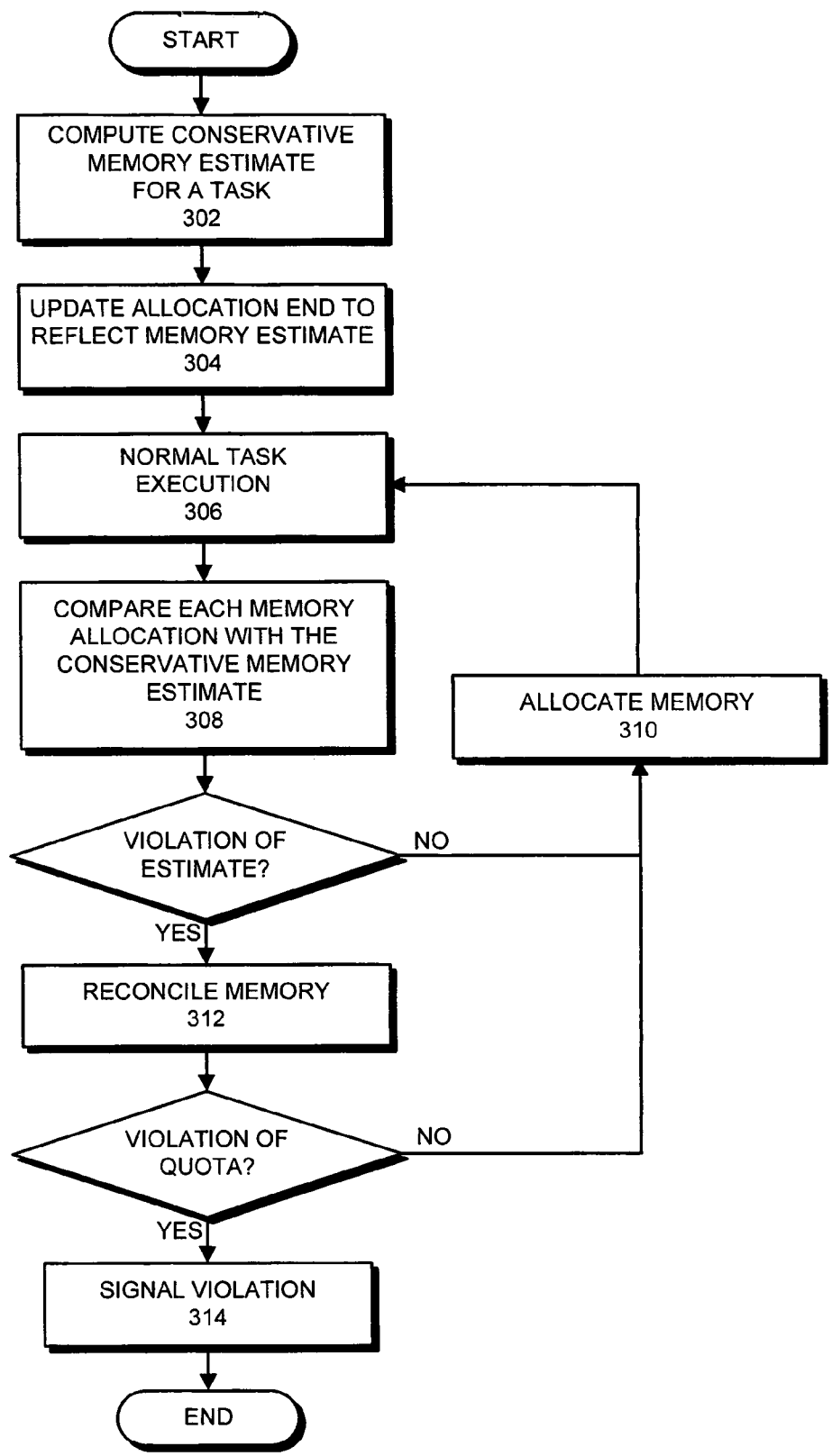
FIG. 3 presents a flowchart illustrating the process of synchronously detecting and signaling memory quota violations in accordance with an embodiment of the present invention.

FIG. 2B illustrates a memory region with sequential allocation and modified pointers during task execution. The present invention overloads the allocation end pointer 208 with a conservative estimate of a task's approximate memory quota. FIG. 3 presents a flowchart illustrating the process of synchronously detecting and signaling memory quota violations. At the beginning of every time slice:

The memory tracker may update memory usage for the previous task;

The memory quota policy may adjust the memory quota of the next task, perhaps by taking into account parameters that include but are not limited to the amount of memory allocated by the previous task during the last time slice;

The system requests a conservative estimate of memory usage for the next task from the tracker (step 302).

The system uses the conservative estimate to adjust the allocation end pointer 208 accordingly for the next task (step 304). The overloaded allocation end 208, which moves to the left (in the direction of the beginning of memory 200), limits the memory available to the task. The allocation end is set to the minimum of the end of the sequential allocation region (the 'hard_end') and the task's quota. Table 2 illustrates the code that updates the allocation end (end_pos).

TABLE 3

```
set_end_pos( task ) {
    int mem_left = get_mem_quota(task) – get_mem_usage(task);
    end_pos = min( current_position + mem_left, hard_end );
};
```

The task proceeds to execute normally (step 306), but because of the overloading of the allocation end variable, the memory allocation operations compare the current position with the conservative memory estimate (step 308) instead of the end of memory. If the allocation does not violate the estimate, memory is allocated normally (step 310). On the other hand, if the allocation end is exceeded, the memory tracker reconciles the memory usage estimates to compute the exact memory usage (e.g. using a garbage collection operation) (step 312), and the allocation end is adjusted accordingly. If the current task still does not have enough memory to complete the allocation, a violation is signaled (step 314), for instance by throwing an out-of-memory exception.

Table 3 illustrates an updated memory allocation function that synchronously detects and signals memory quota violations without adding overhead to common memory allocation operations. The first section of the function, which is typically included inline in the program code for speed, remains unchanged except for the overloaded allocation end pointer (end_pos). The addition of the slow_allocate function allows memory usage to be reconciled as needed to prevent violations without adding additional logic or overhead to the inline allocation code. Since this function is only called when the estimate is exceeded, it does not globally affect allocation speed nor compiled code size.

TABLE 4

```
inline byte* allocate (size) {
    // fast inline memory allocation code
    byte* p = current_pos;
    if ( p + size > end_pos) {
        p = slow_allocate( size );
    }
    current_pos = p + size;
    return p;
}
byte* slow_allocate( size ) {
    // slow portion of allocation, not inline
    garbage_collect_and_reconcile_memory_usage_estimates(size);
    set_end_pos( current_task );
    byte* p = current_position;
    if( p + size > memory_end ) {
        throw( out_of_memory_exception );
    }
    return p;
}
```

Since a task's memory quota can change dynamically, the allocation end pointer is checked at every potential point that the memory quota of the task may change. The memory quota is checked every time a task is switched or a system function call is made.

Note that this method is mostly applicable to single native-threaded virtual machines. In a multi-threaded environment, the system needs to be notified on every task switch. Note also that this sequential "pointer-bumping" memory allocation technique is applicable primarily to sequential memory allocation, which is used by copying and compacting garbage collectors (including generational garbage collectors).

In summary, synchronous detection and signaling of memory quota violations can be achieved without adding additional overhead to typical memory allocation operations. By using approximate checking and a conservative estimate that can be forced to become exact as the task approaches the end of its memory quota, the system ensures that memory reconciliation always occurs at or prior to an actual violation. This allows the system to synchronously signal the memory quota violation, thereby avoiding the drawbacks of asynchronous signaling.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for synchronous detection and signaling of memory quota violations for sequential memory allocation in a shared heap, comprising:
    determining a conservative estimate of memory used by a task at a time the task is switched, wherein the conservative estimate is never less than actual memory usage, and wherein the operation of determining the conservative estimate of memory used is faster than the operation of reconciling the exact memory usage;
    detecting a potential quota violation if the conservative estimate of memory usage indicates that an attempt to allocate memory may violate the task's memory quota;
    reconciling an exact memory usage for the task if the potential quota violation is detected;
    determining a quota violation when the task's exact memory usage violates the task's memory quota; and
    signaling the quota violation synchronously at the time of violation;
    wherein the method provides accurate quota violation detection and signaling without reducing the performance of a critical path of sequential memory allocation; and
    wherein the method improves the accuracy of conservative estimate per-task memory usage tracking by reconciling exact memory usage when an estimate of the task's memory usage exceeds the task's memory quota.

2. The method of claim 1, wherein the conservative estimate of memory usage is detected for every task, wherein an 'allocation end' variable contains a value corresponding to the end of available memory in the shared heap, wherein a memory allocation function ensures that the attempt to allocate memory will not result in exceeding the value in the 'allocation end' variable, and wherein determining the conservative estimate of memory used by the task when the task attempts to allocate memory involves:
    computing dynamically in a memory usage tracker an estimate of the amount of memory available for the task; and
    replacing the value in the 'allocation end' variable with the estimate;
    whereby the attempt to allocate memory will initially fail if the task attempts to allocate beyond the estimate of the task's memory quota.

3. The method of claim 2, wherein reconciling the exact memory usage of the task involves:
    triggering a remedial action if the attempt to allocate memory initially fails;
    wherein the remedial action can include a garbage-collection operation; and
    wherein the garbage-collection operation can include a generational garbage-collection operation and/or a full garbage-collection operation.

4. The method of claim 1,
    wherein determining the conservative estimate of per-task memory usage occurs asynchronously; and
    wherein the operations of detecting and signaling memory quota violations take place synchronously.

5. The method of claim 1, wherein the shared heap is located within at least one of: a platform-independent virtual machine, and a memory-constrained computing device.

6. The method of claim 5, wherein the platform-independent virtual machine is a virtual machine that executes bytecodes on a specific computing platform.

7. The method of claim 6, wherein signaling a violation at the time of the quota violation involves throwing an exception.

8. A computer-readable storage medium storing instructions that when executed by a computer cause the computer to perform a method for synchronous detection and signaling of memory quota violations for sequential memory allocation in a shared heap, the method comprising:
    determining a conservative estimate of memory used by a task at a time the task is switched, wherein the conservative estimate is never less than actual memory usage, and wherein the operation of determining the conservative estimate of memory used is faster than the operation of reconciling the exact memory usage;

detecting a potential quota violation if the conservative estimate of memory usage indicates that an attempt to allocate memory may violate the task's memory quota;

reconciling an exact memory usage for the task if the potential quota violation is detected;

determining a quota violation when the task's exact memory usage violates the task's memory quota; and signaling the quota violation synchronously at the time of violation;

wherein the method provides accurate quota violation detection and signaling without reducing the performance of a critical path of sequential memory allocation; and wherein the method improves the accuracy of per-task memory usage tracking by reconciling exact memory usage when an estimate of the task's memory usage exceeds the task's memory quota.

9. The computer-readable storage medium of claim 8, wherein the conservative estimate of memory usage is detected for every task, wherein an 'allocation end' variable contains a value corresponding to the end of available memory in the shared heap, wherein a memory allocation function ensures that the attempt to allocate memory will not result in exceeding the value in the 'allocation end' variable, and wherein determining the conservative estimate of the memory used by the task when the task attempts to allocate memory involves:

computing dynamically in a memory usage tracker an estimate of the amount of memory available for the task; and replacing the value in the 'allocation end' variable with the estimate;

whereby the attempt to allocate memory will initially fail if the task attempts to allocate beyond the estimate of the task's memory quota.

10. The computer-readable storage medium of claim 9, wherein reconciling the exact memory usage of the task involves:

triggering a remedial action if the attempt to allocate memory initially fails;

wherein the remedial action can include a garbage-collection operation; and wherein the garbage-collection operation can include a generational garbage-collection operation and/or a full garbage-collection operation.

11. The computer-readable storage medium of claim 8, wherein determining the conservative estimate of the per-task memory usage occurs asynchronously; and wherein the operations of detecting and signaling memory quota violations take place synchronously.

12. The computer-readable storage medium of claim 8, wherein the shared heap is located within a memory-constrained computing device.

13. The computer-readable storage medium of claim 8, wherein the shared heap is located within a platform-independent virtual machine.

14. The computer-readable storage medium of claim 13, wherein the platform-independent virtual machine is a virtual machine that executes bytecodes on a specific computing platform.

15. The computer-readable storage medium of claim 14, wherein signaling a violation at the time of the quota violation involves throwing an out-of-memory exception.

16. An apparatus for synchronously detecting and signaling memory quota violations for sequential memory allocation in a shared heap, comprising:

a processor;

a memory;

a first determining mechanism configured to determine a conservative estimate of an amount of memory used by a task at a time the task is switched, wherein the conservative estimate is never less than actual memory usage, and wherein the operation of determining the conservative estimate of memory used is faster than the operation of reconciling the exact memory usage;

a detection mechanism configured to detect a potential quota violation if the conservative estimate of memory usage indicates that an attempt to allocate memory may violate the task's memory quota;

a reconciliation mechanism configured to reconcile an exact memory usage for the task if the potential quota violation is detected;

a second determining mechanism configured to determine a quota violation if the task's exact memory usage violates the task's memory quota; and a signaling mechanism configured to signal the quota violation synchronously at the time of violation;

wherein the method provides accurate quota violation detection and signaling without reducing the performance of a critical path of sequential memory allocation; and wherein the method improves the accuracy of the conservative estimate of per-task memory usage tracking by reconciling exact memory usage when an estimate of the task's memory usage exceeds the task's memory quota.

17. The apparatus of claim 16, wherein the conservative estimate of memory usage is detected for every task, wherein an 'allocation end' variable contains a value corresponding to the end of available memory in the shared heap, wherein a memory allocation function ensures that the attempt to allocate memory will not result in exceeding the value in the 'allocation end' variable, and wherein the checking mechanism configured to check the conservative estimate of the amount of memory used by the task when the task attempts to allocate memory further includes:

a compute mechanism configured to compute dynamically in a memory usage tracker an estimate of the amount of memory available for the task; and a replacement mechanism configured to replace the value in the 'allocation end' variable with the estimate;

whereby the attempt to allocate memory will initially fail if the task attempts to allocate beyond the estimate of the task's memory quota.

* * * * *